No. 692,490. Patented Feb. 4, 1902.
E. H. STEEDMAN.
INSERTED SAW TOOTH.
(Application filed Oct. 11, 1901.)

(No Model.)

Witnesses:
G. A. Pennington
Ralph Kalish

Inventor:
Edwin H. Steedman,
by Bakewell & Cornwall
Attys.

UNITED STATES PATENT OFFICE.

EDWIN H. STEEDMAN, OF ST. LOUIS, MISSOURI.

INSERTED SAW-TOOTH.

SPECIFICATION forming part of Letters Patent No. 692,490, dated February 4, 1902.

Application filed October 11, 1901. Serial No. 78,316. (No model.)

*To all whom it may concern:*

Be it known that I, EDWIN H. STEEDMAN, a citizen of the United States, residing at St. Louis, Missouri, have invented a certain new and useful Improvement in Inserted Saw-Teeth, of which the following is a full, clear, and exact description, such as will enable others skilled in the art to which it appertains to make and use the same, reference being had to the accompanying drawings, forming part of this specification, in which—

Figure 1:
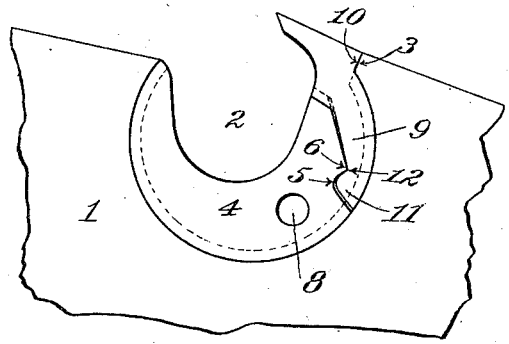
Figure 2:
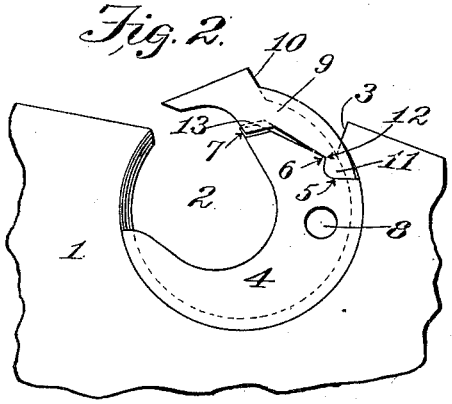
Figure 3:
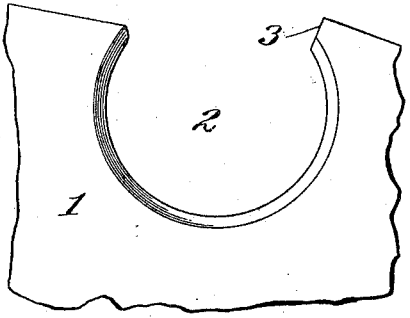
Figure 4:
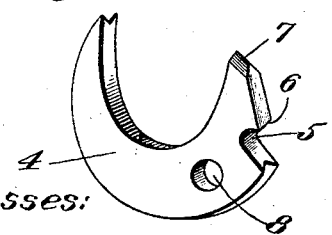
Figure 5:
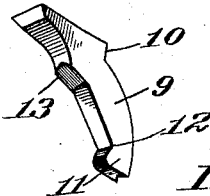

Figure 1 is a side view of a saw with my improved tooth inserted therein. Fig. 2 is a similar view showing the position of the parts while inserting the tooth. Fig. 3 is a view of a section of a saw with the tooth detached. Fig. 4 is a detail view of the mouthpiece, and Fig. 5 is a detail view of the bit-piece.

This invention relates to new and useful improvements in insertible teeth for saws, and pertains more particularly to that class of saws which are provided with a grooved recess to receive the mouthpiece and bit of the tooth, which are rolled into position in the said recess and held therein by appropriate locking devices.

One of the objects of the invention is to provide a tooth for a saw which may be inserted in a recess describing an arc of a circle in the saw, leaving sufficient material in the body of the saw to receive the strain and resistance required when in operation instead of placing the same on the inserted tooth.

Another object of the invention is to provide a tooth for a saw which when inserted in a recess in the saw will firmly secure the bit of the tooth in position and at the same time allow the said bit the desired pitch or hook.

Another object of the invention is to provide a saw-tooth composed of a mouthpiece and bit which may be cheaply constructed and which when placed in position in the recess in the saw will form a firm solid lock therein, preventing any liability of the parts working loose when the saw is in operation, and which at the same time may be easily extracted or inserted in said recess.

With these objects in view the invention consists in the construction, arrangement, and combination of the several parts, all as will hereinafter be described, and afterward pointed out in the claim.

In the drawings, 1 represents the body of the saw, which is provided with a recess 2, said recess being in the form of a segment of a circle described from a center, with the same radius throughout, said recess terminating at its rear edge in a shoulder 3, against which shoulder the bit-piece abuts. The edges of this recess are beveled or inclined on each side to provide an inverted-V-shaped edge for coöperating with correspondingly-shaped grooves in the peripheries of the mouth and bit pieces.

4 indicates the mouthpiece, which is semi-crescentric in shape, the outer periphery thereof being formed with a V-shaped groove to coöperate with the edge of the recess in the body of the saw, said periphery being described from a center corresponding to the center of said recess, said mouthpiece, however, being of slightly greater diameter than the recess, so that it is slightly sprung when in position. The heel of this mouthpiece is notched, as at 5, the said notch forming a shoulder or fulcrum-point 6. The extremity of the heel is formed with beveled faces to provide an interlocking projection 7. An opening 8 is also formed in the mouthpiece for the reception of an appropriate tool, whereby the mouthpiece may be forced into or out of position.

9 indicates the bit-piece, a portion of whose periphery is provided with a V-shaped groove struck from an arc of a circle having a radius common to that of the recess 2. This bit-piece above said curved periphery is provided with a shoulder 10, which is designed when the parts are in the position shown in Fig. 1 to abut against the shoulder 3. The heel of this bit-piece is provided with a projection 11, which matches with the recess 5 in the heel portion of the mouthpiece, said projection 11 forming a recess 12 for receiving the fulcrum-point 6 of the mouthpiece.

13 indicates a shoulder formed with a groove which coöperates with the interlocking projection 7 of the mouthpiece.

In operation the parts are assembled, as shown in Fig. 2, preparatory to inserting the tooth in the saw. The mouthpiece is turned around, drawing the bit-piece after it until the shoulder 10 abuts against the shoulder 3. In this operation the bit-piece is caused to rock on the fulcrum-point 6, the heel of said bit-piece being crowded or pinched when in position, so that when the tooth is home, as shown in Fig. 1, the upper portion of the bit-piece by the engagement of the shoulder 10 with the shoulder 3 is rocked inward, forcing the recessed shoulder 13 down onto the interlocking shoulder 7 of the mouthpiece. When the parts are in this position, both the mouthpiece and the bit-piece are prevented from lateral displacement. The projection 11 being received in the recess 5 prevents independent rotation of either the mouth or bit piece. The grooved peripheries of the mouth and bit pieces prevent lateral displacement of said parts, and the interlocking of the projection 7 with the shoulder 13 firmly holds the inner edge of the bit-piece against lateral displacement. The strain on the bit-piece is communicated directly through the shoulder 10 onto the shoulder 3, so that the parts have no tendency to rotate in the recess. Of course the inner faces of the heels of both the mouth and bit pieces are constructed so as to permit a proper play of the bit-piece in rocking on its fulcrum in order to effect a pinching or binding action of the bit-piece referred to.

I am aware that many minor changes in construction, arrangement, and combination of the several parts of my device can be made and substituted for those herein shown and described without in the least departing from the nature and principle of my invention.

Having thus described my invention, what I claim, and desire to secure by Letters Patent of the United States, is—

The combination with a saw-plate having a curved recess whose periphery is struck from a single center, and a bit-piece whose back conforms to and engages the said plate at the periphery of said recess, said bit-piece having at its front a shoulder, a projection at the inner end of the bit-piece, and a recess formed by said projection and the body portion of the bit-piece between said shoulder and said projection, of a resilient mouthpiece whose outer periphery conforms to and engages the said plate at the periphery of said recess, said mouthpiece having an end portion which, when the parts are assembled in said recess, engages under said shoulder upon the bit-piece, a recess which receives said projection upon the bit-piece, and a fulcrum-point which engages said recess upon the bit-piece, there being, when the said parts are assembled in the said recess of the saw-plate, engagement between said bit-piece and said mouthpiece only at the said shoulder and the point of the said fulcrum; substantially as described.

In testimony whereof I hereunto affix my signature, in the presence of two witnesses, this 7th day of October, 1901.

EDWIN H. STEEDMAN.

Witnesses:
 GEORGE BAKEWELL,
 G. A. PENNINGTON.